United States Patent [19]

Satou

[11] Patent Number: 5,341,105

[45] Date of Patent: Aug. 23, 1994

[54] QUADRATORE DEMODULATOR CIRCUIT UTILIZING AUTOMATIC FREQUENCY CONTROL SIGNAL AND METHOD THEREOF

[75] Inventor: Kazumasa Satou, Fukushima, Japan

[73] Assignee: NEC Corporation, Japan

[21] Appl. No.: 954,272

[22] Filed: Sep. 30, 1992

[30] Foreign Application Priority Data

Sep. 30, 1991 [JP] Japan .................... 3-276450

[51] Int. Cl.⁵ .................................... H03D 3/00
[52] U.S. Cl. ...................... 329/308; 329/309; 375/39; 375/81; 375/82
[58] Field of Search ............ 329/304, 306, 307, 308, 329/309; 375/52-57, 80-87, 97, 120, 39

[56] References Cited

U.S. PATENT DOCUMENTS

| | | | |
|---|---|---|---|
| 4,100,503 | 7/1978 | Lindsey et al. | 331/1 A |
| 5,005,186 | 4/1991 | Aono et al. | 329/304 X |

FOREIGN PATENT DOCUMENTS

| | | | |
|---|---|---|---|
| 57-131151 | 8/1982 | Japan. | |
| 0039923 | 2/1987 | Japan | 329/307 |

*Primary Examiner*—David Mis

*Attorney, Agent, or Firm*—Ostrolenk, Faber, Gerb & Soffen

[57] ABSTRACT

A circuit for regenerating a carrier, through coherent detection and demodulation of a quadrature modulated wave, is controlled by an improved AFC control to prevent possible false pull-in. The carrier regeneration circuit includes detector 1, a first multi-level code discriminator 2, a phase deviation detection circuit 3 and a voltage control oscillator 5. It further comprises a second multi-level code discriminator 6 for multi-level code discriminating two output signal pairs of quadrature detector 1 at the time of data conversion, a correlation circuit 7 for taking the correlation between the output signals of first multi-level code discriminator 2 and the outputs signals of second multi-level code discriminator 6, a determination circuit 8 for determining that the two demodulated main signals of quadrature detector 1 vary at the same time and that the output levels of second multi-level code discriminator 6 become higher than a predetermined threshold value, and a switch circuit 9 for adding the output of correlation circuit 7 to the output of phase deviation detection circuit 3 in accordance with the output of determination circuit 8.

10 Claims, 4 Drawing Sheets

QUADRATORE DEMODULATOR CIRCUIT UTILIZING AUTOMATIC FREQUENCY CONTROL SIGNAL AND METHOD THEREOF

BACKGROUND OF THE INVENTION

1. Field of the Invention

This invention relates to a carrier regeneration circuit for a quadrature demodulator and to a method of carrier regeneration.

2. Description of the Related Art

An exemplary conventional quadrature demodulator (referred to herein at times as a four-phase demodulator) is shown in FIG. 1. Referring to FIG. 1, the quadrature demodulator includes quadrature detector 1 for performing coherent detection, multi-level code discriminator 2 for discriminating two pairs of output signals of quadrature detector 1, phase deviation detection circuit 3 for logically processing the output of multi-level code discriminator 2 and controlling voltage control oscillator 5, low-pass filter 4 for filtering unnecessary spectral components of a control signal outputted from phase deviation detection circuit 3, and voltage control oscillator 5 for regenerating a carrier with which coherent detection is to be performed at quadrature detector 1.

Based on the conventional construction, a quadrature modulated wave p is detected through coherent detection with regenerated carrier u outputted from voltage control oscillator 5 by phase detector 1 and is outputted as base band signal q. Base band signal q is inputted to multi-level code discriminator 2, from which demodulated main signals $D_P$ and $D_Q$ and deviation signals $E_P$ and $E_Q$ are outputted and inputted to phase deviation detection circuit 3. Phase deviation detection circuit 3 logically processes the signals inputted thereto and outputs control signal r for controlling voltage control oscillator 5. Control signal r passes through low-pass filter 4, which is provided for removing unnecessary waves, to make control signal s, which controls voltage control oscillator 5.

A carrier regeneration circuit for a quadrature demodulator is disclosed in JP Patent Publication No. 79904/1991 dated Dec. 20, 1991. The invention provides a carrier regeneration circuit wherein two-phase main signals obtained by quadrature amplitude modulation are detected through quadrature phase detection with the outputs of a voltage control oscillator (VCO) to make two base band signals in the form of digital signal consisting of predetermined number of bits, and the phase difference between the received carrier signal and a standard carrier signal outputted from the voltage control oscillator are correlated in accordance with a value obtained through the exclusive OR gate between the most significant digit (MSD) of one of the main signals and the least significant digit (LSD) of the other main signal, whereby the output frequency of the voltage control oscillator is controlled.

In the conventional carrier regeneration circuit employed in the quadrature demodulator described above, while phase deviation information is extracted and controlled to bring the phase deviation to zero, an AFC (auto frequency control) control signal cannot be extracted, and it is very difficult to eliminate false pull-in of a regenerated carrier, that is, the phenomenon that the frequency of the voltage control oscillator is stabilized at a frequency different from its correct lock frequency.

SUMMARY OF THE INVENTION

It is an object of the present invention to provide a carrier regeneration circuit which regenerates a carrier at the correct lock frequency and permits demodulation of a quadrature modulated wave.

It is another object of the present invention to provide a carrier generation circuit which is capable of performing AFC control which resists non-linear distortion of a transmission line.

It is a further object of the present invention to provide a carrier regeneration method which permits regeneration of a carrier at a correct lock frequency of a carrier regeneration circuit of a quadrature demodulator which performs coherent detection and demodulates a quadrature modulated input signal with a reference carrier outputted from a voltage control oscillator.

In order to attain the above objects, according to one aspect of the present invention, there is provided a carrier regeneration circuit, which comprises a quadrature detector for detecting a quadrature modulated input signal through coherent detection with a reference carrier outputted from a voltage control oscillator, a first multi-level code discriminator for multi-level code discriminating two series of output signals of the quadrature detector, a phase deviation detection circuit for logically processing the outputs of the first multi-level code discriminator to output a phase deviation signal for controlling the voltage control oscillator, a second multi-level code discriminator for multi-level code discriminating the two series of output signals of the quadrature detector at the time of conversion of data, a correlation circuit for correlating the output signals of the first multi-level code discriminator and the output signals of the second multi-level code discriminator, a determination circuit for determining that the two series of output signals of the quadrature detector vary at the same time and that the output levels of the second multi-level code discriminator become higher than a particular threshold value, and a switch circuit for adding the output of the correlation circuit to the output of the phase deviation detection circuit in accordance with the output of the determination circuit.

Preferably, a sampling point of the first multi-level code discriminator is a mostly opened signal point of an eye pattern of a base band demodulated from the input signal. Preferably, the time of conversion of data at the time multi-level code discrimination of the second multi-level code discriminator is executed is precisely between each two adjacent sampling points of the first multi-level code discriminator. Preferably, the correlation circuit calculates two exclusive ORS one calculation being operated between the value of one signal of the two series of output signals of the quadrature detector sampled after one half of a sampling period from a signal point and the value of the other signal of the two series of output signals of the quadrature detector sampled after one sampling period from the same signal point, the other calculation being operated between the two values of the two series of output signals of said four-phase detector with sampling times reversed, and output the result of the logical OR of the two calculation results of the exclusive OR.

According to another aspect of the present invention, there is provided a method of carrier regeneration comprising the steps of detecting a quadrature modulated input signal through coherent detection with a reference carrier outputted from a voltage control oscillator, executing a first multi-level code discrimination from the two series of resultant signals obtained by the coherent detection, detecting phase deviation of the two series of resultant signals through the logical processing of the output signals obtained by the first multi-level code discrimination, and controlling the voltage control oscillation in accordance with a value based on the phase deviation, further comprising the steps of performing second multi-level code discrimination from the two series of resultant signals obtained by coherent detection at each time of data conversion, taking the correlation between the resultant signals of the first multi-level code discrimination and the resultant signals of the second multi-level code discrimination, determining that the two series of resultant signals vary at the same time and that the resultant signal level of the second multi-level code discrimination becomes higher than a predetermined threshold value, and composing, when the result of the determination is positive, the correlation value of the results of the first and second multi-level code discriminations into a control signal of coherent detection based on the phase deviation.

Further, the step of taking the correlation between the two output signals of the result of the first multi-level code discrimination and the output signals of the result of the second multi-level code discrimination may include the steps of calculating the exclusive OR between the value of one signal of the two series of resultant signals of the first multi-level code discrimination sampled after one half of a sampling period from a signal point and the value of the other signal of the two series of resultant signals sampled after one sampling period from the same signal point, and the other exclusive OR between two values of the two series of resultant signals of the first discrimination with their sampling times reveresed, and outputting the result of the logical OR of the two results of the exclusive OR described above.

The novel features which are considered characteristic of the invention are set forth with particularity in the appended claims. The invention itself, however, and additional objects and advantages thereof will best be understood from the following description of embodiments thereof when read in connection with the accompanying drawings.

DESCRIPTION OF THE PREFERRED EMBODIMENT

Figure 4:
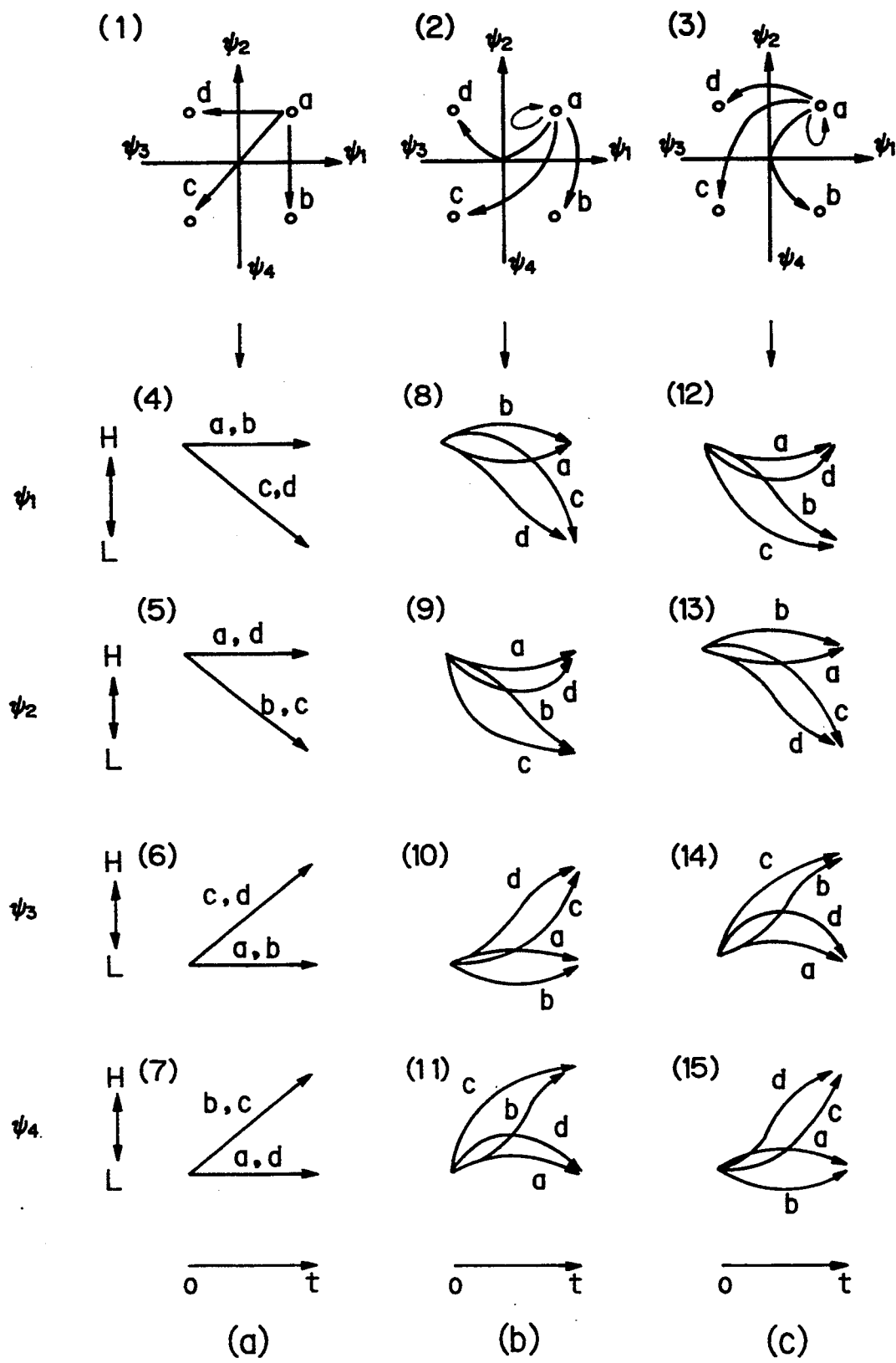
FIG. 4 is a diagrammatic view showing demodulation loci, wherein the diagrams in column (a) show loci when the frequency is stabilized at the correct lock frequency, the diagrams in column (b) show loci in the case of false pull-in (A), and the diagrams in column (c) show loci in the case of false pull-in (B).

The present invention is described below with reference to the drawings. First, a demodulation locus which is commonly known in the art is described with reference to FIG. 4. Locus diagram (1) in FIG. 4 shows movements of a signal as considered from an arrangement of four signals of a quadrature modulation system, and particularly shows loci when signal point a changes to a, b, c and d after time t. Meanwhile, locus diagrams (2) and (3) show loci of the signal until time t after the regenerated carrier enters the false pull-in condition.

The most serious matter in the false pull-in phenomenon is false pull-in in the direction of −90° (clockwise) and in the direction of +90° (counterclockwise) when the frequency is closest to the correct lock frequency. Thus, false pull-in in the direction of −90° is hereinafter referred to as false pull-in (A), and false pull-in in the direction of +90° as false pull-in (B).

When the signal changes, for example, from a to c, if synchronous pull-in takes place regularly, then the signal changes from a to c passing the origin (the center in the signal point arrangement) (locus diagram (1) in FIG. 4). However, in false pull-in (A), the signal rotates in the direction of −90° in the process of changing from a to c; consequently, the signal which is to change to c changes to d (locus diagram (2) in FIG. 4).

On the other hand, in false pull-in (B), since the signal rotates in the direction of +90° in the process of changing from a to c, the signal which is to change to c changes to b (locus diagram (3) in FIG. 4). Similar changes take place upon movement from a to a, from a to b and from a to d.

Locus diagram (4) shows the change in logic levels H and L of a signal seen from direction $\phi_1$ until time t with regard to locus diagram (1). In short, when the signal changes from a to a or from a to b, it changes from logic level H to logic level H, but when the signal changes from a to C or from a to d, it changes from logic level H to logic level L, and those loci are shown in locus diagram (4). Further, loci of a signal when it changes in logic levels H and L seen from direction $\phi_2$ until time t are shown in locus diagram (5). Similarly, loci of a signal when it changes in logic levels H and L seen from direction $\phi_3$ are shown in locus diagram (6), and those when a signal changes in logical levels H and L seen from direction $\phi_4$ are shown in locus diagram (7).

Locus diagram (8) shows the changes in logic levels H and L of a signal seen from direction $\phi_1$ until time t in the case of false pull-in (A). First, when the signal changes from a to a, it changes from logic level H to logic level H, but in the process of the change, it passes the logic level L side with respect to the ordinary locus. On the other hand, when the signal changes from a to b, it changes from logic level H to logic level H, but in the process of the change, it passes the logic level H side with respect to the ordinary locus. In the meantime, when the signal changes from a to c, it does not pass the origin but passes, after time t/2, the logic level H side with respect to the origin. On the other hand, when the signal changes from a to d, it passes the logic level H side with respect to the origin until time t/2 and then passes the logic level L side with respect to the origin after time t/2 until time t. Similarly, loci of the signal changes seen from direction $\phi_2$ are shown in locus diagram (9); those of the signal changes seen from direction $\phi_3$ are shown in locus diagram (10); and those of the a signal changes seen from direction $\phi_4$ are shown in locus diagram (11).

The foregoing description can be applied similarly to false pull-in B, and demodulation loci of a signal are shown in locus diagrams (12) to (15). Here, if notice is taken only of changes of the signal from a to c, when the carrier is synchronized to pull-in with the correct frequency, the signal passes the origin without fail after t/2, but in the false pull-in condition, the signal presents either logic level H or L after t/2. Accordingly, AFC control can be realized by taking the correlation of the logic levels.

Description is given below in the case of a signal chaning from a to c.

In case a signal changes from a to c in false pull-in condition (A), when demodulated main signal DP changes from H to L, as seen from direction $\phi_1$, logic level H is outputted without fail if the signal is sampled after time t/2. When demodulated main signal DP changes from L to H, as seen from direction $\phi_3$, logic level L is outputted without fail if the signal is sampled after time t/2.

Similarly, when demodulated main signal $D_P$ changes from H to L, as seen from direction $\phi_2$, logic level L is outputted without fail after the signal is sampled after time t/2. On the other hand, when demodulated main signal $D_Q$ changes from L to H, as seen from direction $\phi_4$, logic level H is outputted without fail if the signal is sampled after time t/2.

Figure 3:
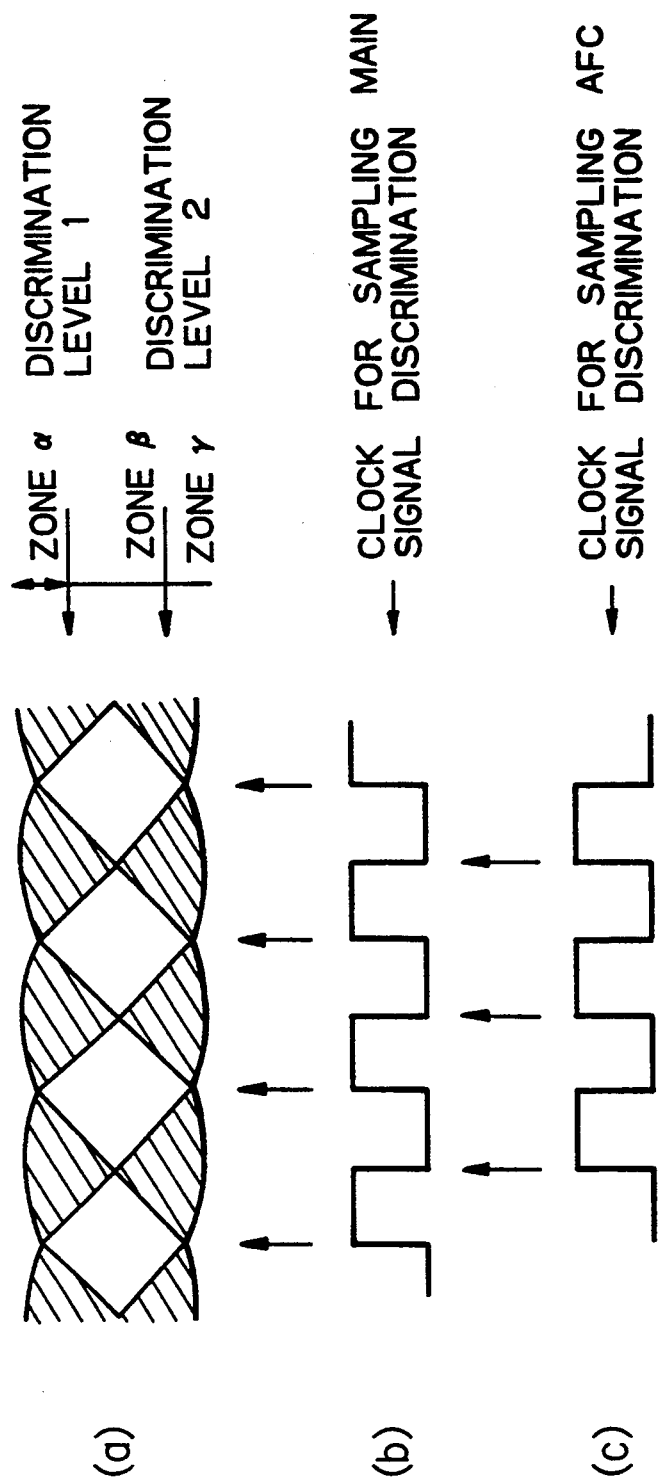
FIG. 3 is a diagram showing discrimination levels of the output of the quadrature demodulator of the carrier regeneration circuit shown in FIG. 2, wherein curve (a) shows an eye pattern, curve (b) shows a clock for sampling main signal discrimination, and curve (c) shows a clock for sampling AFC signal discrimination.

Subsequently, discrimination levels and sampling points are described with reference to FIG. 3. Top curve (a) in FIG. 3 shows a four-phase demodulated eye pattern, and curves (b) and (c) respectively show a clock signal for sampling main signal discrimination which is used in a first multi-level code discriminator and another clock signal for sampling AFC signal discrimination which is used in a second multi-level code discriminator. Here, if sampling is performed with a clock signal of twice the clock frequency, then the clock signal can be used commonly for the first and second multi-level code discriminators. In short, sampling for discrimination of a main signal is performed at the timing of each opening of the eye pattern, and sampling for AFC discrimination is performed precisely between each adjacent opening after time t/2 (0.5 bits) described above.

As regards discrimination levels, two discrimination levels are provided including discrimination level 1 and discrimination level 2 as shown in FIG. 3. In the correct synchronous pull-in condition, when the signal changes from a to d, it passes zone $\beta$ without fail, but in the false pull-in condition, the signal passes zone $\alpha$ or $\gamma$. Accordingly, AFC control can be realized readily in accordance with the result of the discrimination. Further, since the signal is not discriminated in error as long as it passes neither zone $\alpha$ or $\gamma$, it is also possible to perform AFC control which resists non-linear distortion of a transmission line.

Figure 1:
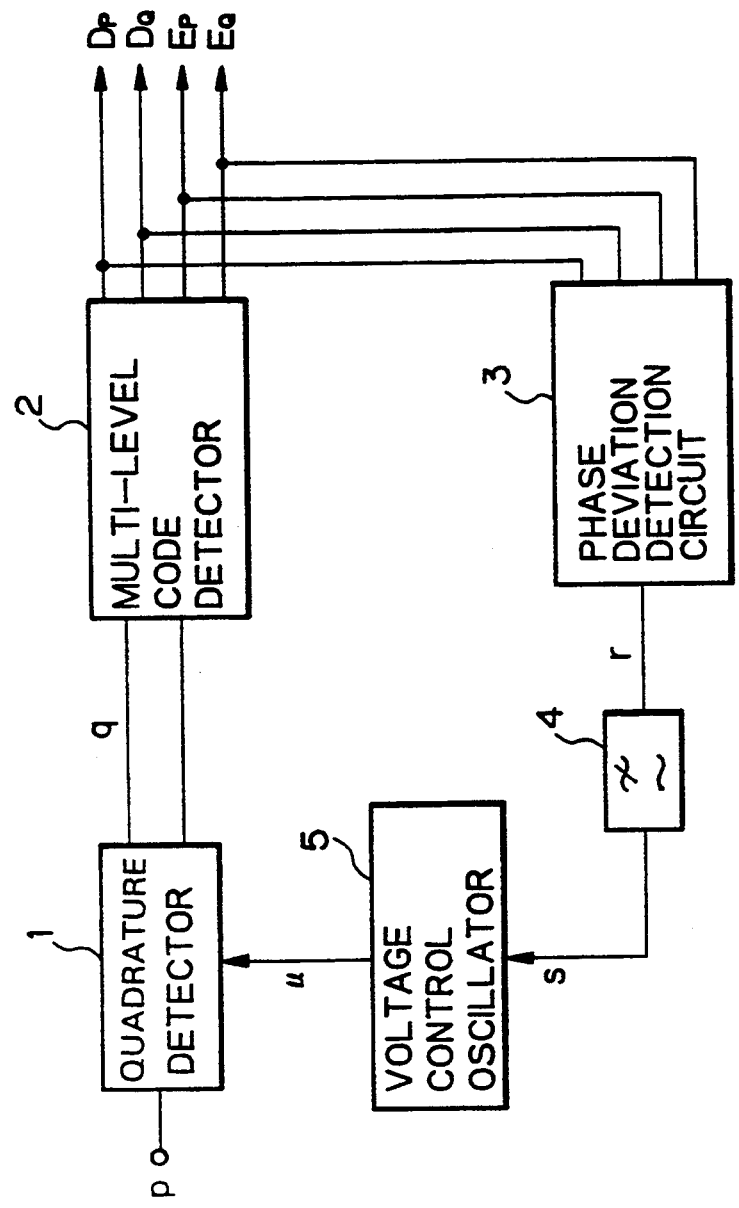
FIG. 1 is a block diagram of a conventional carrier regeneration circuit.
Figure 2:
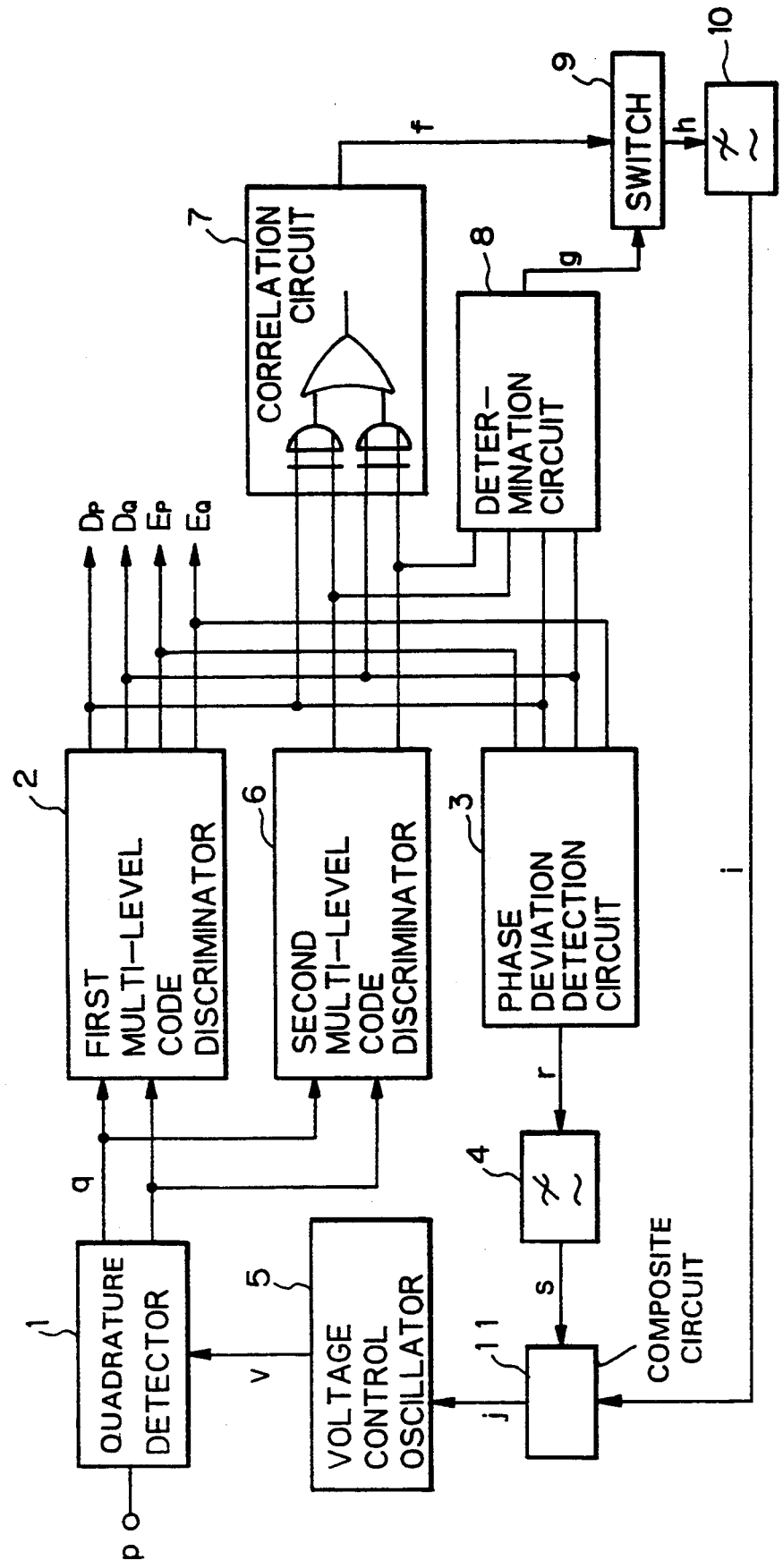
FIG. 2 is a block diagram of a carrier regeneration circuit showing a preferred embodiment of the present invention.

Next, the embodiment of the present invention shown in FIG. 2 is described. The carrier regeneration circuit shown comprises quadrature detector 1, first multi-level code discriminator 2, phase deviation detection circuit 3, low-pass filter 4, voltage control oscillator 5, second multi-level code discriminator 6, correlation circuit 7, determination circuit 8, switch 9, low-pass filter 10 and composite circuit 11. Four-phase modulated wave p is inputted in quadrature detector 1, where it is detected through coherent detection in accordance with regenerated carrier v outputted from voltage control oscillator 5 and is outputted as base band signals q. Base band signals q are supplied to both first and second multi-level code discriminators 2 and 6. Here, first multi-level code discriminator 2 is used to discriminate the main signal of FIG. 3, and second multi-level code discriminator 6 is used to discriminate AFC.

Demodulated main signals $D_P$ and $D_Q$ and deviation signals $E_P$ and $E_Q$ are outputted from first multi-level code discriminator 2 and supplied to phase deviation detection circuit 3, correlation circuit 7 and determination circuit 8. Meanwhile, second multi-level code discriminator 6 samples base band signals q inputted thereto using clocks for sampling AFC signal discrimination, discriminates the thus sampled signals among zones $\alpha$, $\beta$ and $\delta$, and supplies the result of the discrimination to correlation circuit 7 and determination circuit 8.

Phase deviation detection circuit 3 produces, from demodulated main signals $D_P$ and $D_Q$ and deviation signals $E_P$ and $E_Q$ inputted thereto, and outputs automatic phase control signal (APC) r for controlling voltage control oscillator 5. Control signal r is supplied to low-pass filter 4, at which unnecessary waves are removed from control signal r to make signal s. Signal s is changed by composite circuit 11 into control signal j, which is inputted to voltage control oscillator 5.

Correlation circuit 7 takes the correlation between signals $D_P$ and $D_Q$ inputted thereto and outputs a correction as an AFC control signal f. In particular, in the present embodiment, where (t) designates a value sampled after time t and (t/2) designates a value sampled after time t/2, correlation circuit 7 outputs the result of logical calculus OR between the result of exclusive OR between $D_P(t/2)$ and $D_Q(t)$ and another result of exclusive OR between $D_P(t)$ and $D_Q(t/2)$ as AFC signal f.

Determination circuit 8 discriminates the variation of each particular signal described above from the output signals of first multi-level code discriminator 2 and the output signals of second multi-level code discriminator 6 inputted thereto, and outputs control signal g to control switch 9 when the level of each particular signal exceeds its threshold value.

Switch 9 passes AFC control signal f as signal h in accordance with control signal q outputted from determination circuit 8 as a result of the determination. Unnecessary waves are removed from signal h by low-pass filter 10 to make AFC control signal i. AFC control signal i is added to APC control signal s, which is the filtered output of phase deviation detecting circuit 3, through low-pass filter 4 by composite circuit 11 to make control signal j for voltage control oscillator 5. In other words, composite circuit 11 is an adding circuit. Control signal j is inputted to voltage control oscillator 5.

As many apparently widely different embodiments of this invention may be made without departing from the spirit and scope thereof, it is to be understood that the invention is not limited to the specific embodiments thereof except as defined in the appended claims.

What is claimed is:

1. A quadrature demodulator circuit utilizing an automatic frequency control signal, comprising:
    a voltage control oscillator, a quadrature detector for detecting a quadrature amplitude modulated input signal through coherent detection with a reference carrier outputted from said voltage control oscillator, a first multi-level code discriminator for discriminating two pairs of output signals of said quadrature detector, a phase deviation detection circuit for logically processing the output of said first multi-level code discriminator to output a phase deviation signal for controlling said voltage control oscillator, said quadrature demodulator circuit further comprising:

a second multi-level code discriminator for discriminating the two pairs of output signals of said quadrature detector;

a correlation circuit for calculating a predetermined logical correlation between output signals of said first multi-level code discriminator and output signals of said second multi-level code discriminator;

a determination circuit for determining that the two pairs of output signals of said quadrature detector vary at the same time and that the levels of said outputs of said second multi-level code discriminator become higher than a predetermined threshold value; and a composite circuit for adding an output of said correlation circuit to an output of said phase deviation detection circuit receiving an output of said determination circuit.

2. The quadrature demodulator circuit as claimed in claim 1, wherein a sampling point of said first multi-level code discriminator is a mostly opened signal point of an eye pattern of a base band demodulated from the input signal.

3. The quadrature demodulator circuit as claimed in claim 1, wherein a time of conversion of data when the multi-level code discrimination of said second multi-level code discriminator is executed is precisely between each of two adjacent sampling points of said first multi-level code discriminator.

4. The quadrature demodulator circuit as claimed in claim 2, wherein a time of conversion of data when the multi-level code discrimination of said second multi-level code discriminator is executed is precisely between each of two adjacent sampling points of said first multi-level code discriminator.

5. The quadrature demodulator circuit as claimed in claim 1, wherein said correlation circuit obtains two exclusive OR outputs, one of said exclusive OR outputs being derived from the value of one signal of the two pairs of output signals of said quadrature detector sampled after one half of a sampling period from a signal-point and from the value of the other signal of the two pairs of said output signals of said quadrature detector sampled after one sampling period from the same point, and the other exclusive OR output being derived from the two values of the two pairs of output signals of said quadrature detector with sampling times reversed, and outputs a logical combination of said exclusive OR outputs.

6. The quadrature demodulator circuit as claimed in claim 2, wherein said correlation circuit obtains two exclusive OR outputs, one of said exclusive OR outputs being derived from the value of one signal of the two pairs of output signals of said quadrature detector sampled after one half of a sampling period from a signal-point and from the value of the other signal of the two pairs of output signals of said quadrature detector sampled after one sampling period from the same point, and the other exclusive OR output being derived from the two values of the two pairs of said output signals of said quadrature detector with sampling times reversed, and outputs a logical combination of said exclusive OR outputs.

7. The quadrature demodulator circuit as claimed in claim 3, wherein said correlation circuit obtains two exclusive OR outputs, one of said exclusive OR outputs being derived from the value of one signal of the two pairs of output signals of said quadrature detector sampled after one half of a sampling period from a signal-point and from the value of the other signal of the two pairs of output signals of said quadrature detector sampled after one sampling period from the same point, and the other exclusive OR output being derived from the two values of the two pairs of said output signals of said quadrature detector with sampling times reversed, and outputs a logical combination of said exclusive OR outputs.

8. The quadrature demodulator circuit as claimed in claim 4, wherein said correlation circuit obtains two exclusive OR outputs, one of said exclusive OR outputs being derived from the value of one signal of the two pairs of output signals of said quadrature detector sampled after one half of a sampling period from a signal-point and from the value of the other signal of the two pairs of output signals of said quadrature detector sampled after one sampling period from the same point, and the other exclusive OR output being derived from the two values of the two pairs of said output signals of said quadrature detector with sampling times reversed, and outputs a logical combination of said exclusive OR outputs.

9. A method of quadrature demodulation utilizing automatic frequency control signal comprising the steps of detecting a quadrature amplitude modulated input signal through coherent detection with a reference carrier that is output from a voltage control oscillator, executing a first multi-level code discrimination to discriminate two pairs of resultant signals obtained by coherent detection, detecting phase deviation of the two pairs of resultant signals through logical processing of the output signals obtained by the first multi-level code discrimination, and controlling the voltage control oscillator in accordance with a value based on the phase deviation detection, said method of quadrature demodulation further comprising the steps of:

discriminating levels of input signals of a main pair of the two pairs of resultant signals obtained by coherent detection at the time when the output signals convert their values as the second multi-level code discrimination;

taking the correlation between the resultant signals for the first multi-level code discrimination and a resultant of the second multi-level code discrimination;

determining that the two pairs of resultant signals vary at a same time and that the resultant signal levels of the second multi-level code discrimination become higher than a predetermined threshold value;

composing, when the result of the determination is positive, the correlation value of the results for the first and second multi-level code discriminations into a control signal of the coherent detection based on the phase deviation.

10. The method as claimed in claim 9, wherein the step of taking the correlation includes calculating an exclusive OR output of the value of one signal of the two pairs of resultant signals of said first discrimination sampled after one half of a sampling period from a signal point and of the value of the other signal of said two pairs of resultant signals of said first discrimination sampled after one sampling period from the same signal point and calculating another exclusive OR output of two values of the two pairs of resultant signals of said detection with sampling times reversed, and outputting a result of a logical OR of the two results of the exclusive OR outputs.

* * * * *

UNITED STATES PATENT AND TRADEMARK OFFICE
CERTIFICATE OF CORRECTION

PATENT NO. : 5,341,105
DATED : August 23, 1994
INVENTOR(S) : K. Satou

It is certified that error appears in the above-indentified patent and that said Letters Patent is hereby corrected as shown below:

On the title page:

Item [54]: "QUADRATORE" should read --QUADRATURE--

Signed and Sealed this

Fifteenth Day of November, 1994

Attest:

BRUCE LEHMAN

Attesting Officer    Commissioner of Patents and Trademarks